March 2, 1965  C. V. MARTI  3,171,308
SYSTEM OF PERFORMING CUTTING OPERATIONS ON TURNING WORK
Filed Jan. 27, 1964  3 Sheets-Sheet 1
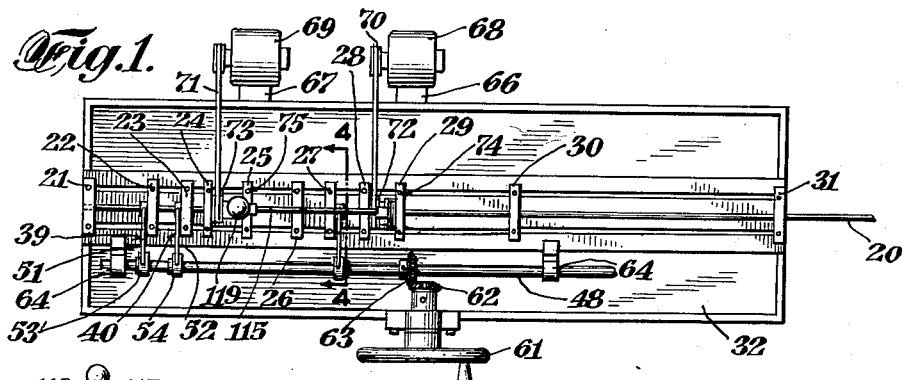
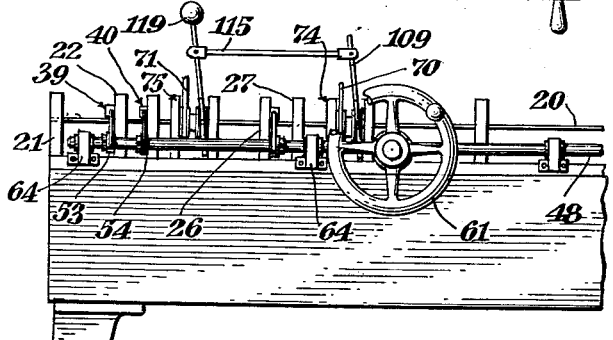
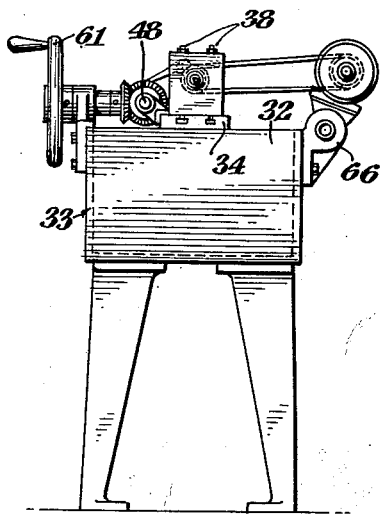
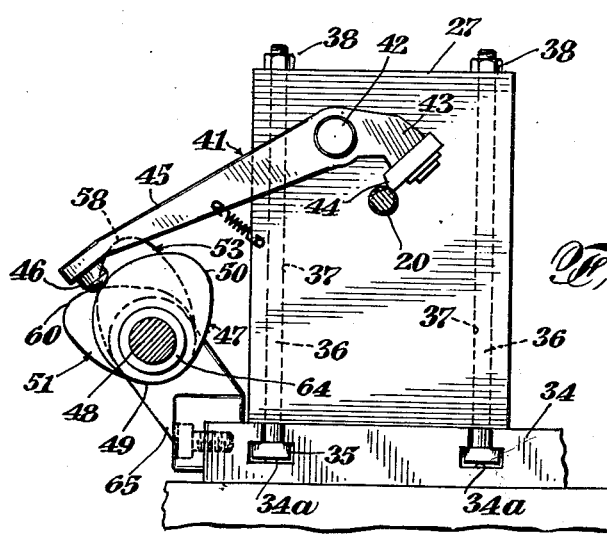
INVENTOR
Charles V. Marti
BY
ATTORNEY March 2, 1965 C. V. MARTI 3,171,308
SYSTEM OF PERFORMING CUTTING OPERATIONS ON TURNING WORK
Filed Jan. 27, 1964 3 Sheets-Sheet 2
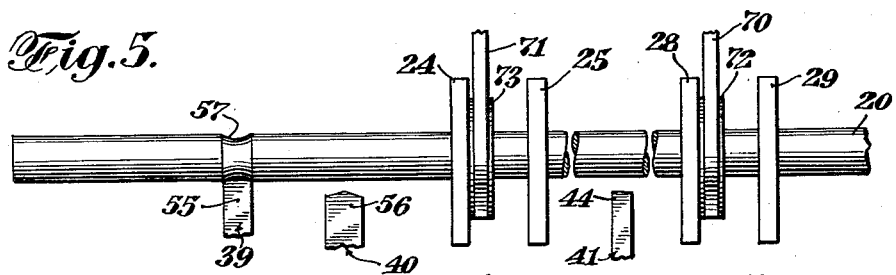
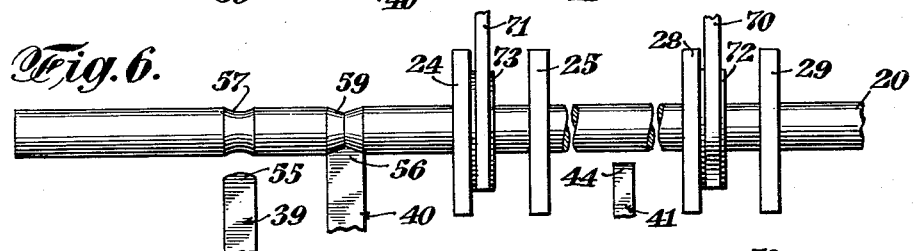
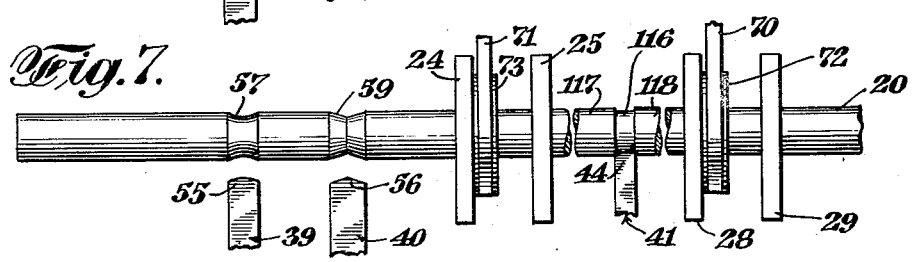
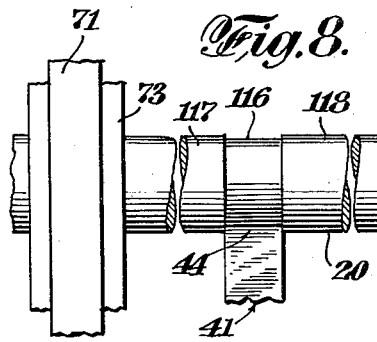
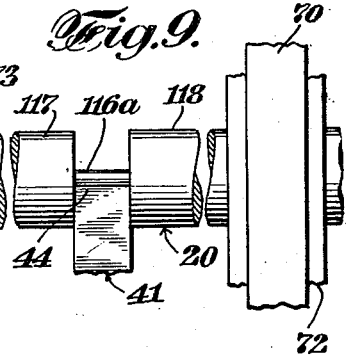
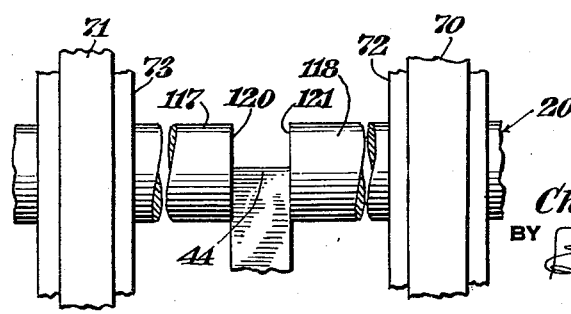
INVENTOR
Charles V. Marti
BY
ATTORNEY March 2, 1965     C. V. MARTI     3,171,308
SYSTEM OF PERFORMING CUTTING OPERATIONS ON TURNING WORK
Filed Jan. 27, 1964     3 Sheets-Sheet 3
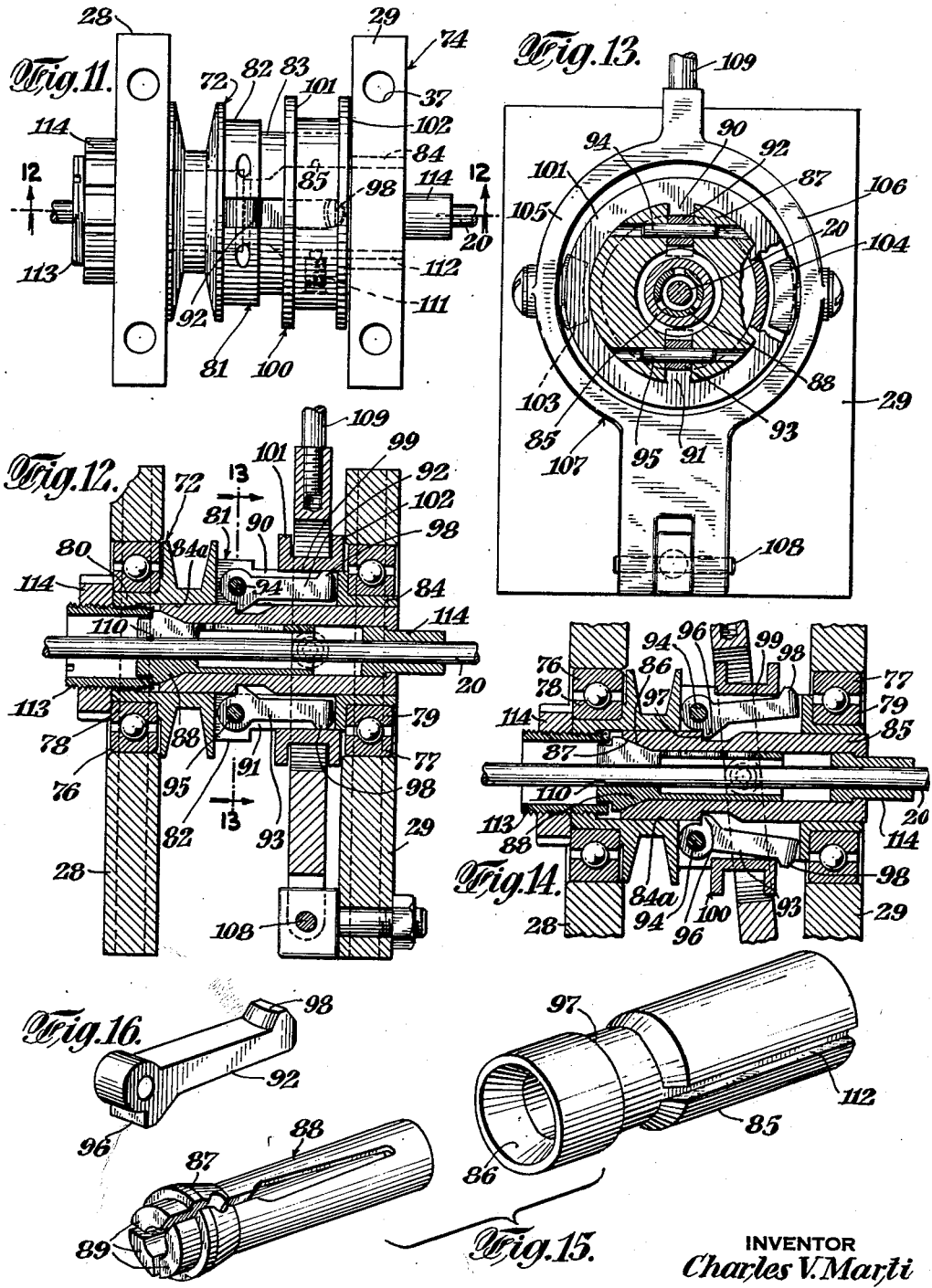
INVENTOR
Charles V. Marti
BY
ATTORNEY United States Patent Office 3,171,308
Patented Mar. 2, 1965

3,171,308
SYSTEM OF PERFORMING CUTTING OPERATIONS ON TURNING WORK
Charles V. Marti, 51 West End Ave., Florham Park, N.J.
Filed Jan. 27, 1964, Ser. No. 340,148
2 Claims. (Cl. 82—2)

This invention relates to metal turning and cut-off machines, and is particularly directed to a system for performing a plurality of grooving, scoring and other turning operations on a shaft or other elongated stock followed by a cutting operation to produce a finished piece of predetermined length.

In conventional machines, such as screw machines, for producing a number of grooved or other annular formations in a rod or shaft, the work is advanced from tool to tool, the progressive feeding of the work and bringing the tools into operative position requiring the use of complicated camming mechanisms and calling for high-cost operators of special skill in resetting and work replacement operations. And in the cut-off operations performed by conventional machines of this category, burrs or protruding tits are invariably formed at the cut-off ends, requiring costly finishing operations.

It is the objective of this invention to provide a turning and cut-off machine having none of the aforesaid disadvantages. More specifically, among the objects of this invention is the provision of means for performing a number of grooving and other forming or turning operations without the need to feed the stock to sequentially arranged tools, the apparatus being adapted to be operated by a relatively unskilled person in a minimum period of time, enabling stock of a length many times that of the required finished stock to be maintained ready for successive feedings to an operative position after the completion of each cycle of forming or turning operations, thereby requiring considerably less operations than are necessary with conventional apparatus.

A further object is to enable a cut-off operation to be performed without leaving any burrs, projections or rough portions on the ends of the work.

It is also an object of my invention to provide a novel chuck adapted to be brought into firm holding and releasing positions, respectively, by positive and quick-acting means.

And it is within the contemplation of this invention to enable the above objectives to be accomplished by a relatively simple and inexpensive machine.

Other objects, features and advantages will appear from the drawings and the description hereinafter given.

The apparatus of my invention employs a plurality of spaced bearings rotatably supporting a length of stock to be worked on and to be divided into a number of separate completed pieces. The cutting tools for performing the required operations are positioned in predetermined spaced relation and in operative proximity to the work, there being a cam shaft parallel to the length of work and having thereon a plurality of cams each in adjacent operative relation to one of said tools, said cams having operative cam surfaces adapted to actuate the respective tools towards and into engagement with the work by an operative rotation of the cam shaft—either through a manually operable wheel or by automatic means known to those skilled in the art. Upon the completion of a predetermined rotative manipulation of the cam shaft, all the turning operations are completed in predetermined sequence; and at or after the last forming operation, the cutting tools are actuated to effect the cut-off operations at the opposite ends of the worked-upon length of stock. During the turning operation, the work is rotated by two spaced driving means, these flanking the cut-off tool positioned at the inner end of the worked-upon length—the end that is joined to the rest of the stock. The rotary driving force is transmitted to the stock by two spaced releasable chucks, the arrangement being such that during the entire cutting-off operation, the sections of the work on the opposite sides of the cutting tool are turning at the same speed. As the cutting tool advances into the work, there is no torsion or shearing effect, such as occurs in conventional apparatus where the turning effort is applied only to the section of the worked-upon stock, the remaining stock on the other side of the cutting tool turning only so long as there is ample connecting stock between the two sections of the work on opposite sides of the cutting tool. As the connecting stock, under said conventional methods, is progressively reduced in diameter, its driving force is correspondingly reduced, resulting in a differential of turning speeds of the stock on opposite sides of the cutting tool. This results in shearing and twisting stresses induced within the thin connecting stock, causing it to break off, the break often extending to the body of the finished piece. This condition, so common with conventional machines, is entirely eliminated by the use of the two spaced driving means on opposite sides of the cutting tool in the apparatus of this invention, resulting in square and smooth ends that require no further finishing operations.

Other objects, features and advantages will appear from the drawings and the description hereinafter given.

Referring to the drawings:

FIG. 1 is a plan view of a machine embodying my invention, the stock to be worked on being operatively in place.

FIG. 2 is a fragmentary front elevation of the machine of FIG. 1.

FIG. 3 is an end view of said machine.

FIG. 4 is an enlarged section of FIGS. 1 and 2 taken along line 4—4, parts being omitted for clarity.

FIG. 5 is an enlarged fragmentary semi-schematic plan view of the driving means and tools in operative relation to the stock, parts being removed for clarity, one forming tool being shown in operative engagement with the stock, another forming tool and the cut-off tool being in inoperative positions.

FIG. 6 is a view like FIG. 5, but showing the first-mentioned forming tool in retracted position, the other forming tool in operative engagement with the stock and the cut-off tool in inoperative position.

FIG. 7 is a view like FIG. 5, but showing both forming tools in retracted positions, and the cut-off tool at the beginning of its operative engagement with the stock.

FIG. 8 is a further enlarged fragmentary plan view of a portion of FIG. 7, but showing only fragmentary portions of the driving pulleys and the cut-off tool.

FIG. 9 is a view like FIG. 8, showing the cut-off tool in a further advanced operative position.

FIG. 10 is a view like FIG. 9, showing the tool in its final position after completing its cutting operation.

FIG. 11 is a plan view of the pulley-chuck control unit showing a fragmentary portion of the stock in operatively engaged position therein, the manually operable control yoke being omitted for clarity.

FIG. 12 is a section of FIG. 11 taken along line 12—12, the control yoke and handle being shown in operative position.

FIG. 13 is a section of FIG. 12 taken along line 13—13, a fragment being removed for clarity.

FIG. 14 is a fragmentary view like FIG. 12, but showing the device in its inoperative non-engaging position.

FIG. 15 is an exploded perspective view of the chuck and coactive sleeve used in my invention.

FIG. 16 is a perspective view of one of the two diametrically opposite sleeve-actuating dogs of the chuck-control assembly.

In the particular embodiment of my invention illustrated in the drawings, the stock 20 to be worked on is supported by a plurality of spaced bearing members 21, 22, 23, 24, 25, 26, 27, 28, 29, 30 and 31, these being slidably positioned along the longitudinal extent of the bedplate 32 forming part of the supporting structure 33. A base plate 34 carried by the bedplate 32 contains two parallel T-slot tracks 34a slidably accommodating therein the heads 35 of the bolts 36 extending downwardly through passageways 37 in each of said bearing members, nuts 38 securing said bolts in place. In the apparatus as shown in the drawings there are forming tools 39 and 40 suitably attached to the adjacent bearing members 22 and 23, respectively, and one cut-off tool 41 attached to the bearing member 27. As illustrated in FIG. 4, the cut-off tool 41 is pivotally mounted at 42 on bearing member 27, the tool being of bell-crank configuration, its rear arm 43 carrying the cutting bit 44 positioned for cutting engagement with the stock 20, the forward follower arm 45 carrying the follower element 46 in operative engagement with the cam 47 fixedly mounted on the cam shaft 48. At the low region 49 of cam 47 the cutting bit 44 is in its retracted position (shown in FIGS. 5 and 6), and at the high region 50 said cutting bit is in the final cut-off position (shown in FIGURE 10) as will more clearly hereinafter appear. The said forming tools 39 and 40 are similarly mounted on their respective bearing members 22 and 23, and have respective follower arms 51 and 52 in operative engagement with the cams 53 and 54, respectively. Said tool 39 has the forming bit 55 adapted to form the annular groove 57 in the work 20 (see FIGS. 5 and 6) when the follower arm 51 is in operative engagement with the high region 58 of cam 53; and said tool 40 has the forming bit 56 adapted to form the annular groove 59 in the work 20 when the follower arm 52 is in operative engagement with the high region 60 of cam 51. When the said tools are in operative engagement with the low regions of the respective cams, the tools are in their respective retracted positions shown in FIGS. 5, 6 and 7. The coactive relation of said tools and work are well understood by those skilled in the art; hence no further details or descriptions thereof are deemed necessary for an understanding of this invention. It should, however, be noted that the cams may be slidably moved along the cam shaft 48 and, by known means, affixed thereto in positions operatively adjacent their corresponding tool members, the arrangement being such that the tool and cam positioning can be adjusted in accordance with predetermined grooving and cutting positions. The said cam shaft 48 is supported by a plurality of bearings 64 which are mounted on the brackets 65 attached to the plate 34 (FIG. 4).

Attached to the structure 33 is the rotatably mounted cam-shaft actuator handwheel 61 operatively connected to the gear 62 in engagement with gear 63 affixed on the cam shaft 48. The arrangement is such that an operative rotation of wheel 61 will cause a rotation of the cam shaft, thereby bringing the said tools towards, into and away from the work in predetermined sequence in accordance with the operative settings of the respective cams. The handwheel turning operation is effective in forming the aforesaid annular grooves and in severing the worked-on portion of the stock 20 from the rest of the stock during the operative turning of the stock effected by driving means in the manner hereinbelow described.

Suitably mounted on brackets 66 and 67 are the respective motors 68 and 69, operable at identical speeds. These motors are connected by the respective belts 70 and 71 to the pulleys 72 and 73, respectively. It is important to note that the said pulleys 72 and 73 are in flanking relation to the cut-off tool 41, a relationship which constitutes an important aspect of this invention, as will more fully hereinafter be set forth.

Pulleys 72 and 73 are each, in the particular form of my invention illustrated, a part of a pulley-chuck control unit, pulley 72 being a part of unit 74 and pulley 73 being a part of unit 75, both units being identical. Referring to FIGS. 11 to 16, it will be seen that the said bearing members 28 and 29 are also a part of unit 74; and similarly, bearing members 24 and 25 are a part of unit 75, as shown in FIG. 1. Since units 74 and 75 are similarly constructed, the descriptions here given of unit 74 applies also to unit 75.

The said bearing members 28 and 29 support the outer ball-bearing races 76 and 77, respectively, these being in rotatable engagement with the respective inner races 78 and 79. The pulley 72 has on the left side (FIGS. 12 and 14) an annular hub 80 fixedly attached to said inner race 78, and on its right side it has the stepped extension 81 comprising three sections, the adjacent cylindrical section 82, the intermediate cylindrical section 83 and the end cylindrical section 84 fixedly attached to the said inner race 79. The arrangement is hence such that the operative rotation of the pulley 72 causes the said inner races 78 and 79 to rotate in coactive relation to said respective outer races 76 and 77, whereby the pulley is rotatably supported by said ball-bearing assemblies in known manner. The said pulley 72 and its said associated cylindrical parts 80 and 81 are hollow, having the interior annular wall 84a slidably accommodating therein the chuck-actuating sleeve 85, the forward portion of said sleeve having an internal conical wall 86 proportioned and positioned for embracing engagement with the conical head 87 of the chuck 88, of spring steel, with three longitudinal slits forming the three yieldably supported mutually coactive sections 89.

At diametrically opposite sides of said stepped extension 81 are the slotted portions 90 and 91 accommodating therein the respective dogs 92 and 93 pivotally mounted on the pins 94 and 95, respectively. Each dog has an actuating lip 96 adapted to engage the adjacent annular shoulder 97 of the said sleeve 85, the rear end of each dog having a projection 98 normally projecting beyond the annular surface 99 of said intermediate cylindrical section 83. Slidably mounted over said surface 99 is the channel-shaped outer sleeve member 100 accommodating between the flanges 101 and 102 thereof the shoes 103 and 104 supported by the opposing arms 105 and 106, respectively, of the yoke member 107, the bottom portion thereof being pivotally mounted at 108, the upper portion having attached thereto the handle member 109.

When said handle 109 is moved towards the right, it will operatively move the said outer sleeve 100 to the position indicated in FIG. 12. This will cause said sleeve 100 to engage the projections 98 of said dogs 92 and 93, causing the dogs to rotate about said pins 94 and 95, whereby the said lips 96 of said dogs will press against said annular shoulder 97 of said inner sleeve 85 and force it to move to the left. This will cause the conical surface 86 of the sleeve to compress the three yieldable chuck sections 89 inwardly and cause them to frictionally grip the work 20 extending through the axial passageway 110 of the chuck 88. When this occurs, the operative rotation of the pulley 72 will cause said stock 20 to rotate, since the chuck is caused to rotate by the frictional engagement therewith of said inner sleeve 85, said sleeve being connected to the pulley 72 by the set screw 111 extending into and in slidable engagement with the longitudinal slot 112 in said inner sleeve 85.

It will be noted that said chuck 88 is maintained in operative engagement with the sleeve by the hollow cylindrical retainer 113 in threaded engagement with the inner annular wall of the said pulley hub 80, the nut 114 locking the member 113 in place. At the opposite end is the collar 114 extending from and fixedly attached to the rear end of said inner sleeve 85.

To release the stock from the chuck's grip, all that need be done is to move the handle 109 to the left, to the position indicated in FIG. 14, thereby moving the outer sleeve 100 to its inoperative position out of engagement with the said projections 98 of the dogs. The pressure of the said lips 96 against the annular shoulder 97 will then be released, permitting the three yieldable sections 89 of the chuck 88 to return to their unstrained retracted positions out of gripping engagement with the stock 20.

It will be observed (FIGS. 1 and 2) that there are two handles 109 and 109a operatively associated with the two pulley-chuck control units 74 and 75, both handles being interconnected by the link 115. The arrangement is such as to permit a single manipulation of the knob 119 operatively to actuate both handles and their associated parts. Moving the knob to the right will cause the stock 20 to be gripped by the chucks of both units 74 and 75, so as to permit the rotary drives 68 and 69 to apply the same turning forces on opposite sides of the cut-off tool member 41.

By referring to FIGURES 5 and 6, it will be noted—for the particular embodiment of my invention illustrated—that the grooving operations at 57 and 59 on the stock have been performed by the forming tools 39 and 40 before the cutting action of the cut-off tool has begun. The beginning of the cut-off operation is shown in FIGURES 7 and 8. In the condition of the stock shown in FIG. 8, the connecting section 116 between sections 117 and 118 is of substantial thickness; but in the condition of the stock as shown in FIG. 9, the connecting section has been reduced to the proportions of the illustrated connecting section 116a by the operative cutting action of the bit 44. If the turning effort had been exerted only on one side of the stock as in conventional apparatus—say on the side of section 117 by the action of the belt 71 on pulley 73— the said connecting section 116a would be too thin to transmit the turning movement of section 117 to section 118 at the speed of the former. Consequently section 118 would turn at a lower speed than section 117, causing connecting section 116a to twist, and ultimately to break. As aforesaid, it is this speed differential between the stock sections on opposite sides of the cut-off tool in conventional cut-off operations that have been the cause of the formation of stubs and tits at the ends of the work, requiring special finishing operations.

In contrast to the above-mentioned speed differential of the work sections on opposite sides of the cut-off tool in conventional procedures, sections 117 and 118 of the stock 20 used with the present invention rotate at equal speeds, since both belts 70 and 71 apply their respective turning efforts on both sections 117 and 118. Inasmuch as there is no need to depend for the transmission of turning effort on a progressively thinning connecting section, such as section 116a, no twisting or shearing strains will be induced in said connecting section. Hence the cutting tool 44 can complete its cut-off operation past the axis of rotation, as indicated in FIG. 10, leaving smooth and square ends 120 and 121 on the now separated sections 117 and 118.

Upon the completion of the above-described cut-off operation, the work is released from the chuck, in the manner aforesaid, by the operative manipulation of knob 119. Thereafter the work is moved forwardly (to the left in FIGURES 1 and 2), and out through the front bearing 21. This can be done by pushing the stock 20 at the rear of the machine forwardly, thereby simultaneously ejecting the completed stock and placing the adjacent unworked portion of the stock in position for a new cycle of forming and cut-off operations. No further feeding or tool-setting operations are required, since the tools are in position for operative actuation by the coactively positioned cams.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In a work turning and cut-off apparatus, a plurality of spaced bearing members positioned for rotatably supporting a length of work along a predetermined axis of rotation, said bearing members having through bearing passageways therein whereby the work may be moved longitudinally therethrough, cut-off means positioned for operative engagement with said length of work when operatively supported by said bearing members, actuating means for moving said cut-off means transversely with respect to said axis for cutting through said work, and two pulley-chuck control units flanking said cut-off means, each of said units comprising a pulley member with oppositely disposed hollow extensions, bearing members rotatably supporting said extensions, a releasable chuck within said pulley and positioned for operative engagement with said work when operatively in place, and manually manipulable means in operative engagement with said chuck for moving it between its operative engaging and releasing positions; and belt driving means operatively connected to the pulleys on both of said control units for rotating them at the same speed, whereby the sections of the work on opposite sides of said cut-off means will continuously rotate at the same speed during the entire operative movement of said cut-off means, said manually manipulable means having for each pulley an inner sleeve positioned within said pulley and rotatably movable therewith, and also movable axially between an inoperative position at which said sleeve is out of engagement with said chuck and an operative position at which it is in pressing engagement with said chuck for holding it in its operative work-engaging position, said inner sleeve having a shoulder on its outer surface, one of said pulley extensions having therein a slotted portion, a pivotally mounted dog within said slotted portion and having an inner lip engageable with said shoulder and also having an outer projection extending outwardly beyond the outer surface of said inner sleeve, an outer sleeve slidably mounted over said slotted pulley extension between a retracted position out of engagement with said dog projection and an operative position in engagement therewith, said inner and outer sleeves and said dog being so proportioned and positioned that when said outer sleeve is in operative engagement with said dog extension the said lip of the dog will be in pressing engagement with said shoulder to cause said inner sleeve to be brought into operative pressing engagement with said chuck, and a manually operable member in engagement with said outer sleeve for moving the latter between its said retracted and operative positions.

2. In a work turning and cut-off apparatus, a plurality of spaced bearing members positioned for rotatably supporting a length of work along a predetermined axis of rotation, cut-off means positioned for operative engagement with said length of work when operatively supported by said bearing members, actuating means for moving said cut-off means transversely with respect to said axis for cutting through said work, and two pulley-chuck control units flanking said cut-off means; each of said units comprising a pulley member with oppositely disposed hollow extensions; bearing members rotatably supporting said extensions, a releasable chuck within said pulley and positioned for operative engagement with said work when operatively in place; manually manipulable means in operable engagement with said chucks, a pivotably mounted yoke disposed about said manually manipulable means and in engagement therewith, said yoke being provided with a handle thereon for moving said yoke and thereby moving said manually manipulable means between its operative engaging and releasing positions; said handles on said yokes being connected for conjoint operation, and belt driving means operatively connected to the pulleys on both of said control units for rotating them at the same speed, whereby the sections of the work on opposite sides of said cut-off means will continuously rotate at the same speed during the entire movement of said cut-off means, said manually manipulable means having for each pulley an inner sleeve positioned within said pulley and rotatably movable therewith, and also movable axially between an inoperative position at which said sleeve is out of engagement with said chuck and an operative position at which it is in pressing engagement with said chuck for holding it in its operative work engaging position, said inner sleeve having a shoulder on its outer surface, one of said pulley extensions having therein a slotted portion, a pivotably mounted dog within said slotted portion and having an inner lip engageable with said shoulder and also having an outer projection extending outwardly beyond the outer surface of said inner sleeve, an outer sleeve slidably mounted over said slotted pulley extension, said pivotably mounted yoke being disposed about said outer sleeve and having a plurality of shoes in engagement therewith, said handle being connected to said pivotably mounted yoke, whereby when said handle is operatively moved said outer sleeve is moved between a retracted position out of engagement with said dog projection and an operative position in engagement therewith, said inner and outer sleeves and said dog being so proportioned and positioned that when said outer sleeve is in operative engagement with said dog projection the said lip of the dog will be in pressing engagement with said shoulder to cause said inner sleeve to be brought into operative pressing engagement with said chuck.

References Cited by the Examiner
UNITED STATES PATENTS

| | | | |
|---|---|---|---|
| 504,083 | 8/93 | Hoffmann | 82—2.5 XR |
| 621,418 | 11/99 | Jacobs | 82—2.5 XR |
| 1,118,875 | 11/14 | Newton | 82—2 |
| 2,326,541 | 8/43 | Kuehn | 82—2.5 XR |
| 2,373,155 | 4/45 | White | 82—2.5 |
| 2,377,384 | 6/45 | Slovak | 82—47 |

ANDREW R. JUHASZ, *Primary Examiner.*

WILLIAM W. DYER, JR., *Examiner.*